April 27, 1926.

V. VITULLO

ICE CREAM CUTTER

Filed June 15, 1925

1,582,103

Inventor
Vito Vitullo
by Parker & Carter
    Attorneys.

Patented Apr. 27, 1926.

1,582,103

UNITED STATES PATENT OFFICE.

VITO VITULLO, OF CHICAGO, ILLINOIS.

ICE-CREAM CUTTER.

Application filed June 15, 1925. Serial No. 37,158.

*To all whom it may concern:*

Be it known that I, VITO VITULLO, a citizen of the United States, residing at Chicago, in the county of Cook and State of Illinois, have invented a certain new and useful Improvement in Ice-Cream Cutters, of which the following is a specification.

My invention relates to an ice cream cutter and particularly to a cutter for cutting relatively large bricks or blocks of ice cream into a plurality of thin slices. One object of my invention is to provide means for severing such blocks into slices of the proper size for ice cream sandwiches. Another object is to provide an ice cream cutter or slicer the knife of which may operate alternately on pivotally located bricks of cream, in order to speed up the operation. Other objects will appear from time to time in the course of the specification and claims.

I illustrate my invention more or less diagrammatically in the accompanying drawings wherein—

Like parts are indicated by like symbols throughout the specification and drawings.

Figure 1:
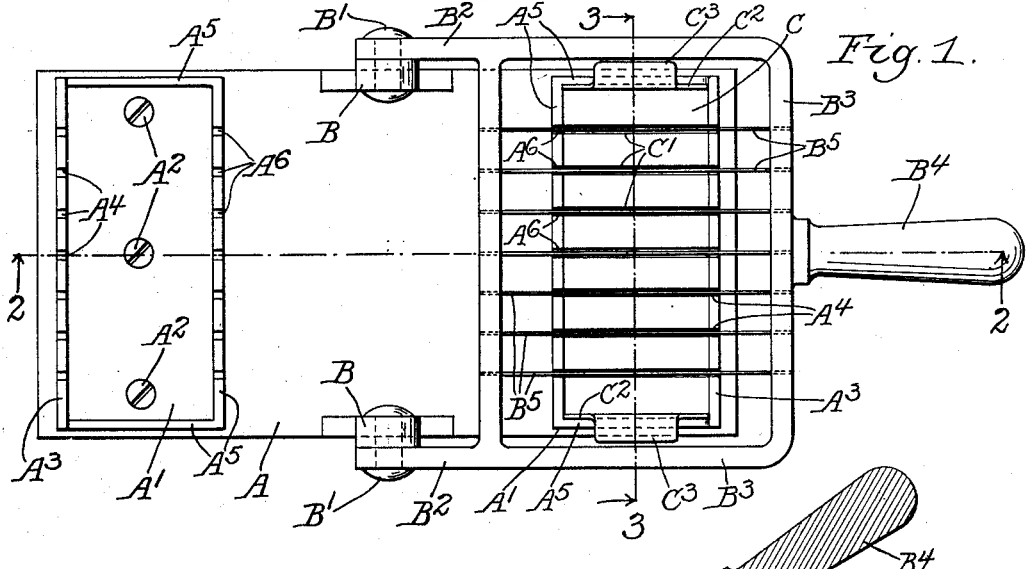
Figure 1 is a plan view.
Figure 2:
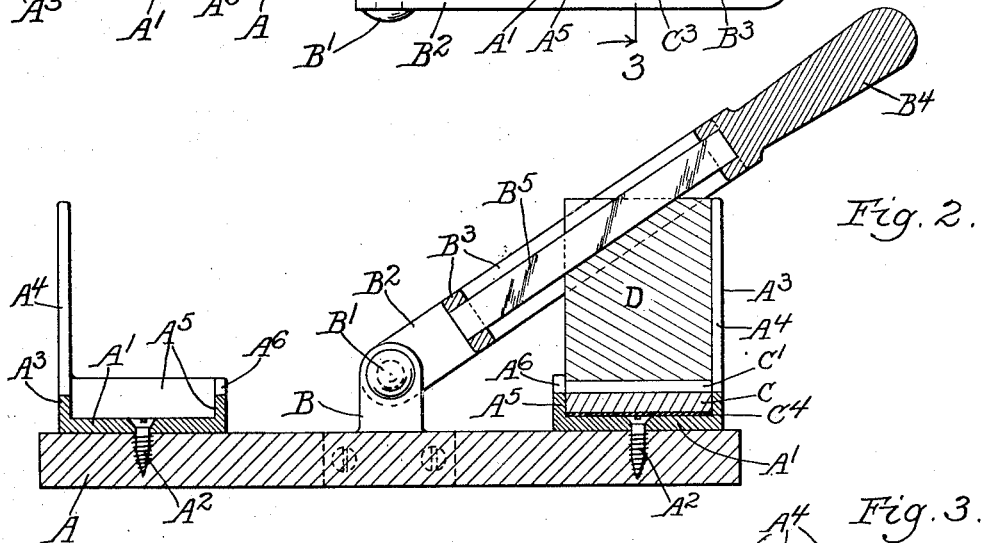
Figure 2 is a section on line 2—2 of Figure 1.

Referring to the drawings A is any suitable base portion herein shown as a wooden block. Mounted at each end thereof are the identical but reversed holding supports $A^1$ secured to the wooden base for example by the screws $A^2$. Each support has a relatively high rear or outside wall $A^3$ having a plurality of slots $A^4$. The rest of the support may be surrounded by a rim or stop $A^5$ which may if necessary be slotted as at $A^6$. It will be realized of course that I do not limit myself to any specific height of wall and that if conditions warrant the entire support may be surrounded by walls of equal height.

Positioned upon the base between the two supports are the bearing members B and the bearing pins $B^1$ upon which are pivoted the members $B^2$ of the knife frame $B^3$. The frame is shown as of generally rectangular form and provided with a handle $B^4$ and a plurality of knife blades $B^5$, which may be of wire or of any suitable knife stock. It will be realized that the blades are so positioned as to enter the slots $A^4$ and $A^6$. In order to support the ice cream bricks D I provide holding or carrier members consisting of the wooden base portion C slotted as at $C^1$ with the thin metal reinforcing base $C^4$ and the end portions $C^2$ being provided for example with holding lugs or handles $C^3$.

Figures 3, 4:
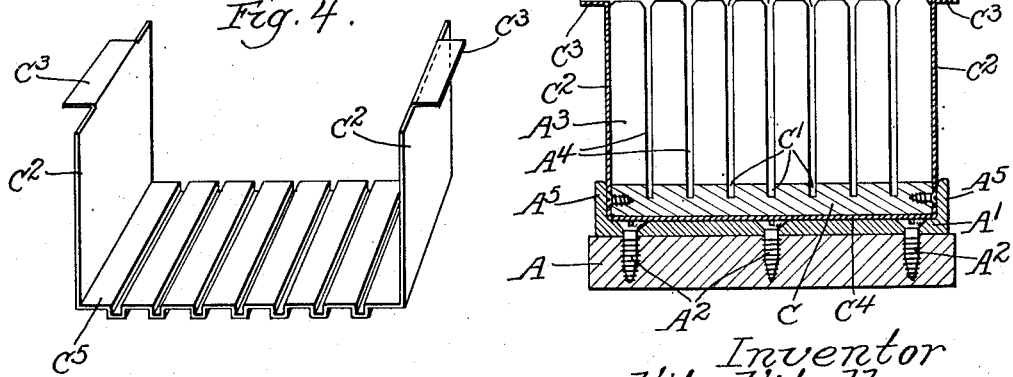
Figure 3 is a section on the line 3—3 of Figure 1.
Figure 4 is a perspective view of a modified form of carrier.

The modified carrier of Figure 4 is identical with the carrier of Figure 3 save for the substitution of a slotted metal base $C^5$ for the wooden base. It will be realized that whereas I have described and shown a practical and operative device, that nevertheless many changes might be made in size, shape, number and disposition of parts without departing from the spirit of my invention. I therefore wish my description to be taken as in a broad sense illustrative rather than as limiting me to my specific showing.

The use and operation of my invention are as follows: In the dispensing of ice cream sandwiches, formed of a relatively thick layer or wafer of ice cream positioned between a pair of relatively thin sheets of cracker, cake or other pastry it is desirable to have an ice cream cutting means whereby the standard bricks of ice cream may be rapidly cut into a large number of slices of uniform size. It is desirable also that the cutting operation be performed with a minimum handling of the brick and that ready means be provided for removing from the cutting mechanism the several pieces. I therefore provide a supporting base on which is hinged a multiple blade knife. In order to increase the capacity of the machine I provide two ice cream brick supports one on either side of the base, so that the knife may be swung alternately for each support. The bricks are handled by being placed on carriers, the carriers being positioned on the supports. The carrier bottoms and the walls of the supports are all slotted in alignment with the blades. After each cutting excursion of the knife the carrier is removed from the support with the severed slices on it and is located at the proper point for inserting the slices into the sandwiches. Thus no intermediate handling of the separate slices is necessary until they are actually being positioned in the sandwitches. If the cream is of such consistency that the withdrawal strokes of the knife tends to damage the slices they may be removed from the carrier before the upward stroke of the knife, for example by being thrust forwardly upon a supplemental carrier which may be temporarily positioned between the pivot of the knife and the inner edge of the support. I may, under some circumstances, omit the use of the carrier altogether, and position the brick directly upon the support.

I claim:—

1. In an ice cream slicing machine a base, a multiple blade knife pivoted on said base, an ice cream block support, side walls therefor, slotted from top to bottom to permit the penetration of said knife, a removable ice cream block carrier adapted to be positioned on said support, comprising a bottom member, end members, and handles associated with the end members.

2. In an ice cream slicing machine an ice cream block support, a multiple blade knife pivoted adjacent said support and adapted to be swung thereover, an ice cream block carrier adapted to be removably positioned on said support and comprising a bottom and end members and means for centering it on said support, comprising end stops and side stops, said side stops being slotted from top to bottom.

3. In an ice cream slicing machine a base, a multiple blade knife pivoted on said base, a plurality of ice cream block supports positioned one on one side of said knife and one on the other, said knife being adapted to be swung into cutting position over either base and removable ice cream block carriers adapted to be positioned on said supports, each comprising a bottom member and end members.

4. In an ice cream slicing machine, a supporting base, a multiple blade knife pivoted on said base, a pair of ice cream block supports, one positioned on each side of the pivot point of said knife and side walls therefor, slotted to permit the penetration of said knife, the side walls on the side adjacent the pivot of the knife being substantially lower than the opposite side walls.

5. In an ice cream slicing machine, a supporting base, a multiple blade knife pivoted on said base, a pair of ice cream block supports, one positioned on each side of the pivot point of said knife and side walls therefor, slotted to permit the penetration of said knife, removable ice cream block carriers adapted to be positioned on said supports, each comprising a bottom member and end members.

6. In an ice cream slicing machine an ice cream block support, a multiple blade knife pivoted adjacent said support and adapted to be swung thereover, an ice cream block carrier adapted to be removably positioned on said support and comprising a bottom and end members and stops associated with said support and adapted to prevent lateral or longitudinal movement of the carrier.

7. In an ice cream slicing machine an ice cream block support, a multiple blade knife pivoted adjacent said support and adapted to be swung thereover, an ice cream block carrier adapted to be removably positioned on said support and comprising the slotted bottom portion and end members associated therewith.

Signed at Chicago county of Cook and State of Illinois, this 11th day of June 1925.

VITO VITULLO.